US011665091B2

(12) United States Patent
Rao et al.

(10) Patent No.: US 11,665,091 B2
(45) Date of Patent: *May 30, 2023

(54) OPTIMIZATIONS FOR PE-CE PROTOCOL SESSION HANDLING IN A MULTI-HOMED TOPOLOGY

(71) Applicant: Cisco Technology, Inc., San Jose, CA (US)

(72) Inventors: Dhananjaya Rao, Sunnyvale, CA (US); Ali Sajassi, San Ramon, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 157 days.

This patent is subject to a terminal disclaimer.

(21) Appl. No.: 17/172,496

(22) Filed: Feb. 10, 2021

(65) Prior Publication Data

US 2021/0168073 A1    Jun. 3, 2021

Related U.S. Application Data

(63) Continuation of application No. 16/438,836, filed on Jun. 12, 2019, now Pat. No. 10,965,593.

(51) Int. Cl.
*H04L 45/64* (2022.01)
*H04L 45/00* (2022.01)
(Continued)

(52) U.S. Cl.
CPC .......... *H04L 45/64* (2013.01); *H04L 12/4641* (2013.01); *H04L 12/66* (2013.01);
(Continued)

(58) Field of Classification Search
CPC . H04L 2101/677; H04L 45/66; H04L 45/245; H04L 45/64; H04L 12/66
(Continued)

(56) References Cited

U.S. PATENT DOCUMENTS 7,633,956 B1    12/2009   Parandekar et al.
8,004,968 B2     8/2011   Sajassi et al.
(Continued)

OTHER PUBLICATIONS

Patel, Keyur et al., "State Reduction in the Interconnection of BGP EVPN Host Routed Domains Inter Domain Route Distribution Scaling With Optimal Forwarding Paths and Mechanism for Handling Mac Mobility in Networks With Default Gatewatys", IP.com Prior Art Database Technical Disclosure, IP.com No. 000244032, Cisco Systems, Inc. 2015, 16 pages.
(Continued)

*Primary Examiner* — Peter G Solinsky
(74) *Attorney, Agent, or Firm* — Edell, Shapiro & Finnan, LLC (57) ABSTRACT

Apparatuses and methods are provided in which a CE protocol communication session is established, at a first provider edge network device (PE), for customer equipment device (CE) multi-homed to the first PE and one or more second PEs. The first PE is an owner of the CE protocol communication session. The first PE signals to the one or more second PEs an ownership message indicating that the first PE is the owner of the CE protocol communication session. The ownership message includes parameters that enable one or more second PEs to install in their respective forwarding tables a redirect policy to instruct the respective PE to forward packets of this session to the first PE via an overlay segment. The first PE receives the packets of the session via the overlay segment based on the ownership message.

20 Claims, 7 Drawing Sheets

(51) Int. Cl.
H04L 12/66 (2006.01)
H04L 12/46 (2006.01)
H04L 45/24 (2022.01)
H04L 101/677 (2022.01)

(52) U.S. Cl.
CPC ............ H04L 45/245 (2013.01); H04L 45/66 (2013.01); *H04L 2101/677* (2022.05)

(58) Field of Classification Search
USPC .......................................................... 370/351
See application file for complete search history.

(56) References Cited

U.S. PATENT DOCUMENTS

| | | | |
|---|---|---|---|
| 8,166,205 | B2 | 4/2012 | Farinacci et al. |
| 8,694,664 | B2 | 4/2014 | Jain et al. |
| 8,717,934 | B2 | 5/2014 | Bacthu et al. |
| 8,724,456 | B1 | 5/2014 | Hong et al. |
| 8,724,627 | B2 | 5/2014 | Filsfils et al. |
| 8,743,886 | B2 | 6/2014 | Pati et al. |
| 9,071,458 | B2 | 6/2015 | Rao et al. |
| 9,148,290 | B2 | 9/2015 | Salam et al. |
| 9,363,225 | B2 | 6/2016 | Moreno et al. |
| 9,521,073 | B2 | 12/2016 | Rao et al. |
| 9,548,887 | B2 | 1/2017 | Ashtaputre et al. |
| 9,548,917 | B2 | 1/2017 | Jain et al. |
| 9,762,545 | B2 | 9/2017 | Badoni et al. |
| 10,250,552 | B1 | 4/2019 | Sajassi |
| 10,965,593 | B2 * | 3/2021 | Rao ........................ H04L 45/64 |
| 2014/0269410 | A1 | 9/2014 | Shah et al. |
| 2017/0288948 | A1 | 10/2017 | Singh et al. |
| 2017/0310548 | A1 | 10/2017 | Jailani |
| 2018/0109444 | A1 | 4/2018 | Sajassi et al. |
| 2018/0167315 | A1 | 6/2018 | Kanjariya et al. |
| 2019/0052559 | A1 | 2/2019 | Velayudhan et al. |
| 2019/0166407 | A1 | 5/2019 | Sajassi et al. |
| 2019/0305988 | A1 | 10/2019 | Bickhart et al. |
| 2020/0099659 | A1 | 3/2020 | Cometto et al. |
| 2020/0127919 | A1 | 4/2020 | Nagarajan et al. |

OTHER PUBLICATIONS

Unknown, "How does anycast work with tcp—Server Fault", 7 pages, https://serverfault.com/questions/616412/how-does-anycast-work-with-tcp, downloaded Feb. 28, 2019.

Sajassi, Ali et al., "Multi-homed L3VPN Service with Single IP peer to CE draft-sajassi-bess-evpn-l3vpn-multihoming-01", BESS Workgroup, 9 pages, https://www.ietf.org/archive/id/draft-sajassi-bessevpm-l3vpn-multihoming01, downloaded Feb. 28, 2019.

B. Kothari et al., "BGP based Multi-homing in Virtual Private LAN Service", Network Working Group, Jul. 25, 2019, 21 pages.

* cited by examiner

OPTIMIZATIONS FOR PE-CE PROTOCOL SESSION HANDLING IN A MULTI-HOMED TOPOLOGY

CROSS REFERENCE TO RELATED APPLICATION

This application is a continuation of U.S. application Ser. No. 16/438,836, filed Jun. 12, 2019, the entirety of which is incorporated herein by reference.

TECHNICAL FIELD

The present disclosure relates to network communications.

BACKGROUND

More and more digital services are becoming available to consumers. To provide these services, businesses store their digital data in computing environments such as datacenters. Because of vast amounts of information that needs to be supported by the datacenters, data centers may become virtualized to accommodate the increasing amounts of data and increasing demands on the computational resources required to provide the digital services.

A virtualized datacenter may include several geographically remote locations that are connected to one another via communication networks. A virtualized datacenter may include customer equipment or customer edge (CE) devices, such as servers, virtualized servers, virtual machines (VMs) running on the servers and/or physical appliances, connected to provider edge (PE) network devices to obtain access to a core network. The PE network devices are network elements such as routers, switches, gateways, etc. The PE network devices support the transport of traffic data to network devices which transport data across public network or networks to other PE network devices and eventually to other CE devices, such as another location of the virtualized data center. Many types of networks are available to transport data such as local area networks (LANs) and wide area networks (WANs). Additionally, many overlay networks now exist to support virtualization of digital services. Overlay networks may include virtual LANs (VLANs), virtual private networks (VPNs) and virtual extensible LANs (VXLANs), for example. Many protocols exist to support the transport of data between the CE devices and the PE network devices across various types of networks.

DESCRIPTION OF EXAMPLE EMBODIMENTS

Overview

Briefly, methods and apparatuses are provided to optimize communication between the CE devices and the PE network devices in a multi-homed environment. In these methods, deterministic and persistent PE-CE protocol session is setup and maintained on all-active multi-homed PE network devices by an overlay data plane.

Further, methods are provided in which a CE protocol communication session is established at a first PE network device among a plurality of PE network devices which includes the first PE network device and at least one second PE network device. The CE protocol communication session is established for the CE device multi-homed to the first PE network device and the at least one second PE network device. The first PE network device is an owner of the CE protocol communication session. The method further includes signaling, by the first PE network device, to the at least one second PE network device, an ownership message indicating that the first PE network device is the owner of the CE protocol communication session. The ownership message includes parameters that enable the at least one second PE network device to install in a forwarding table a redirect policy to instruct the at least one second PE network device to forward packets of the CE protocol communication session to the first PE network device via an overlay segment. The method further includes receiving, at the first PE network device, the packets of the CE protocol communication session via the overlay segment based on the ownership message.

Example Embodiments

A virtualized datacenter network may include a switch fabric consisting of a number of network elements, such as datacenter switches or routers, being controlled by a network controller. The network controller may be connected to every network element in the fabric and manages or controls configurations of the network elements in the virtualized datacenter network. In one form, the network elements may be organized into multiple levels, such as in a leaf-spine architecture that includes the PE network devices and spine network devices in which all the PE network devices are connected to all of the spine network devices. The PE network devices provide network connectivity to the CE devices, such as servers (physical appliances), virtualized servers, and VMs. The PE network devices are connected to the CE devices via physical switch ports. The PE network devices may implement Layer 2 bridging and Layer 3 routing functions utilizing local secure databases stored in a cache of a respective PE network device.

Further, in an example embodiment, the PE network devices are connected to each of the spine network devices. The number of spine network devices, the PE network devices, and the CE devices, however, may vary widely depending on a particular configuration of the virtual datacenter network. The spine network device switches packets between various PE network devices, which in turn provide data packets to and from the CE devices. The PE network devices implement most of the protocol functions for routing and forwarding packets. It is to be understood that the techniques presented herein are applicable to network architectures other than a leaf-spine architecture.

To improve reliability of data transport and increase performance and/or speed of the data transport, the CE devices may be supported or multi-homed to a pool of the PE network devices. That is, access redundancy is provided by having a CE device serviced by a pool of PE network devices. Since a CE device is supported by a pool of PE network devices (two or more PE network devices), little or no packet loss can occur upon failure of one of the PE network device. Nevertheless, protocols need to support and account for the multi-home environment.

In an example embodiment of the multi-homed environment, when a session is established between the CE device and the PE network devices, one PE network device is elected from among the plurality of PE network devices to be an active PE network device while others become standby PE network devices. Data traffic from the CE device is provided to the active PE network device, and is then forwarded to the spine network devices, such as spine switches. However, when there is an active-active forwarding and hashing across the uplinks connecting the CE device to the pool of the PE network devices, traffic for an established session may arrive at a different PE network device than the active PE network device. Protocols need to support the traffic for the established session being deterministically terminated on a single active PE network device and not on another one of the PE network devices in the pool. Otherwise, unnecessary delays associated with reestablishment of sessions and packet losses will occur. In example embodiments, the ownership of a session is signaled among the PE network devices in the pool such that persistent session ownership is maintained. The PE network device that establishes the communication session with the CE device is called an "owner PE network device". The communication session is deterministically terminated at the owner PE network device unless there is failure of the owner PE network device and/or a complete isolation of the CE device, as explained in further detail below.

An example embodiment will now be explained with reference to an Ethernet VPN (EVPN) described in RFC 7432 (Multi-homed L3 VPN Service with Single IP peer to CE) where a Border Gateway Protocol (BGP), for example, is used for routing traffic between the CE device and a PE network device. One of ordinary skill in the art, however, would readily realize that the techniques may be applicable to other PE-CE signaling protocols, currently known or later developed, such as Internet Gateway Protocol (IGP).

In a BGP session, the PE network devices share the same Integrated Routing and Bridging (IRB) address (anycast-gateway (GW) address). As such, due to the all-active (A-A) nature of the links and the fact that the BGP control packets from the CE device may get load-balanced and hashed to any link and arrive on one of the PE network devices in the pool, the following situations need to be handled. First, all of the multi-homing members of the PE network device pool consume data traffic incoming to the anycast gateway IP. However, a BGP control protocol session needs to be deterministically terminated or hosted on a single PE network device (the owner of the session). Second, the established BGP session should be persistent on the owner PE network device despite link failures, link additions, and multi-homing PE network device additions. Although these situations would cause the BGP session flows to be rehashed over links to another PE network devices in the pool, the traffic needs to arrive to the owner PE network device from the other PE network devices in the pool. In various example embodiments, techniques are provided to achieve deterministic and persistent PE-CE protocol session setup on all-active multi-homing PE network devices, leveraging and extending BGP-EVPN route signaling and protocol redirection over a VPN/overlay data plane.

Figure 1:
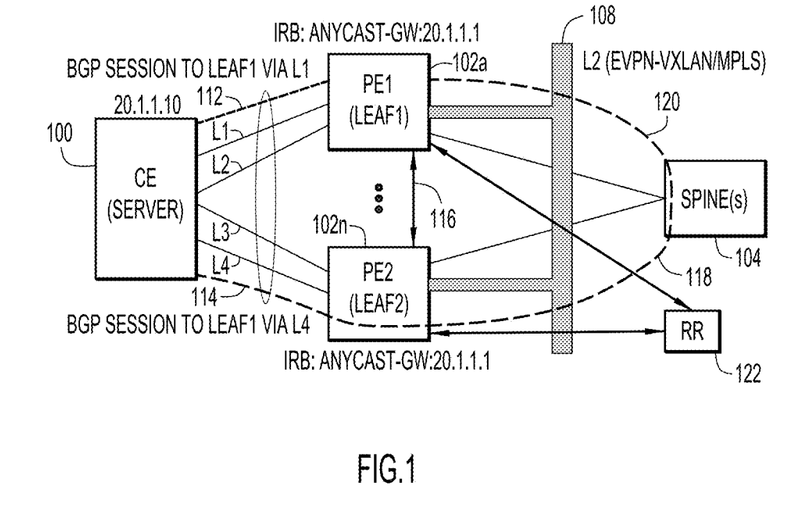
FIG. 1 is a diagram illustrating a CE device being multi-homed to a pool of PE network devices, according to an example embodiment.

FIG. 1 is a diagram illustrating a CE device being multi-homed to a pool of PE network devices, according to an example embodiment.

With reference to FIG. 1, an EVPN IRB topology is provided in which a CE device, depicted as the CE (Server) 100, such as a virtualized server or a physical appliance, is multi-homed to a pool of PE network devices 102a-102n. The CE device 100 may be a VM on a server, such as a virtual network function (VNF), acting as a L3 VPN CE device running BGP to the anycast-gateway IP address (IRB: Anycast-GW:20.1.1.1) on the switches that act as the PE network devices 102a-102n, depicted as PE1 (Leaf1), . . . , PE2 (Leaf2). That is, the PE network devices 102a-102n are leaf switches that act as an anycast default-gateway for the server hosted subnets. In FIG. 1, the uplinks L1 and L2 are connected to the PE network device 102a and uplinks L3 and L4 are connected to the PE network device 102n. The uplinks L1, L2, L3, and L4 are provided by way of an example and not by way of a limitation. One of ordinary skill in the art would readily appreciate that the number of uplinks can vary and there can be uplinks L1-Ln, depending on various implementation details. The uplinks L1, L2, L3, and L4 may be part of a link aggregation group (LAG) such as Ethernet channels or a multi-chassis LAG. As shown in FIG. 1, there are spine network devices, shown collective at reference numeral 104.

When the CE device 100 is connected to a pool of PE network devices 102a-102n via the uplinks L1, L2, L3, and L4, to forward data traffic from the CE device 100, a BGP session over a Transmission Control Protocol (TCP) session is established between the CE device 100 and only one of the PE network devices 102a-102n. As explained above, since the CE device 100 is unaware that it is connected to multiple PE network devices 102a-102n because the pool of PE network devices 102a-102n share the same IRB address, data traffic of the BGP session may be hashed onto any of the uplinks L1, L2, L3, and L4 via load balancing and arrive to a different PE network device from the PE network device with which the BGP session is established. The BGP session ownership, however, needs to be maintained by the owner PE network device. In an example embodiment, due to the active-active forwarding and hashing across the server uplinks L1, L2, L3, and L4, and the need to maintain the BGP session on a single PE network device, persistent ownership of a session is established and maintained via overlay signaling.

The session ownership to a specific PE network device from among the PE network devices 102a-102n may be actively assigned based on a designated forwarder (DF) election mechanism used to identify an active PE network device and standby PE network devices for the Layer 2 (L2) segment. In other words, the session ownership may be assigned by default (e.g., a coin toss) or via load balancing at the PE network devices level. Since the session ownership is assigned under the control of the multi-homed PE network devices, it is called an active assignment of session ownership. Active session ownership assignment is sufficient for typical multi-tenant deployments. However, insertion of a new PE network device (new leaf switch) on an L2 segment may change the DF, and subsequently change session ownership.

In FIG. 1, active session ownership is assigned to the PE network device 102a (sometimes referred to herein as the first PE network device 102a or the owner PE network device 102a) via load balancing, for example. As such, as shown at 112, the PE network device 102a transmits a request to establish a TCP connection for a BGP session (a BGP request) to the CE device 100 via link L1 and starts a timer. The CE device 100 generates an acknowledgement message (BGP ack). In a TCP flow, the hashing of packets by the CE device 100 is independent of the session ownership assignment because of the same anycast address assigned to the pool of PE network devices 102a-102n. At 114, the acknowledgement message may be hashed onto link L4 because of load balancing. The acknowledgement message is delivered to the PE network device 102n. Since the acknowledgement message is delivered to a different PE network device i.e., the PE network device 102n, the PE network device 102a will not receive the acknowledgement message and may timeout.

To avoid this, at 116, protocol session ownership is signaled between the PE network devices 102a-102n so that the PE network device 102a will receive the acknowledgement message before timing out. Specifically, a bridge 108 is established between the PE network device 102a and the PE network device 102n. The acknowledgement message is forwarded from the PE network device 102n to the PE network device 102a via the bridge 108, e.g. an encapsulation such as Layer 2 (L2) (EVPN-VXLAN/Multi-Protocol Label Switching (MPLS)). As an alternative, at 118 and 120, the acknowledgement message may be forwarded from the PE network device 102n to the PE network device 102a via one of the spines network devices 104.

According to another example, a session ownership may be assigned passively based on the hashing. That is, the session ownership may be passively set up on one of the PE network devices 102a-102n. The PE network device 102a may become an implicit owner of the session based on the BGP session flow from the CE device 100 being hashed to the PE network device 102a. That is, initially, the BGP session flow hashes to the link L1 at 112, which then arrives at the PE device 102a. The flow hashing of the BGP session flow from the CE device 100 determines which PE network device the flow terminates and hence, implicitly determines the owner PE network device. This may be useful to provide more granular load balancing of the BGP sessions in some specific deployments. For example, in a deployment in which there are multiple CE devices attached to a pool of PE network devices on a single Layer 2 segment, passive session ownership setup may be preferred.

Once the PE network device 102a becomes an implicit owner of the session based on the BGP session flow hashing, the PE network device 102a signals its ownership to other members of the PE network device pool, such as the PE network device 102n, at 116. In a passive session ownership setup, the PE network device 102a may signal its ownership to a route reflector (RR) 122, rather than or in addition to signaling to each of the other PE network device in the pool. The other PE network devices in the pool, such as the PE network device 102n, will receive ownership of the BGP session information via the RR 122.

The PE network device 102a is the owner and as such, signals ownership to the other PE network devices in the pool, such as the PE network device 102n, or to the RR 122 using BGP-EVPN or Location Identifier Separation Protocol (LISP) or other network overlay signaling protocols. The other PE network devices in the pool, including the PE network device 102n, add a data plane redirect policy to forward incoming protocol packets from the CE device 100 to the PE network device 102a. As such, the BGP session over the TCP may be established in a LAG environment.

The synchronization of ownership among the PE network devices 102a-102n allows for persistent ownership of the established session. For example, if link L1 fails, the session flow may be hashed to the link L4 at 114 and will arrive at the PE network device 102n, which shares the same address (Anycast-GW:20.1.1.1). Without persistent ownership of the established session, a session flap may occur with the default behavior of the PE network device 102n consuming BGP packets destined to the Anycast-GW IP address, such that the initial session will be torn down and re-established to the PE network device 102n and may then switch back to the PE network device 102a, when the link L1 comes back up. In example embodiment, however, the session flap is avoided and the session persists to the PE network device 102a once established by redirecting session's packets from the other PE network devices (the PE network device 102n) to the PE network device 102a via an L2 overlay segment, the bridge 108, or via one of the spine network devices 104 (at 118 and 120). The session persists and will only fail if the PE network device 102a (the owner) fails or loses all the links to the CE device 100 (complete CE link isolation occurs).

The failure of the PE network device 100a may be detected by other PE network devices in the pool, such as the PE network device 102n, through withdrawal of EVPN Ethernet Segment (ES)-Ethernet Auto Discovery (EAD) Route per ES route for L2 segment by the PE network device 102a (the owner) or by detection of the PE network device 102a (the owner) failure via a Bidirectional Forwarding Detection (BFD) protocol of a Layer 2 VPN. When the failure is detected, the other PE network devices in the pool, such as the PE network device 102n, remove the data plane redirect policy for the protocol session packets and a new session is established with one of the other PE network devices in the pool, such as the PE network device 102n. The established session is kept persistent to the owner PE network device even during a particular link failure.

In example embodiments, such as the ones explained above, the A-A forwarding of data is maintained while the BGP session itself is only with a single PE network device in the multi-home cluster.

Figure 2:
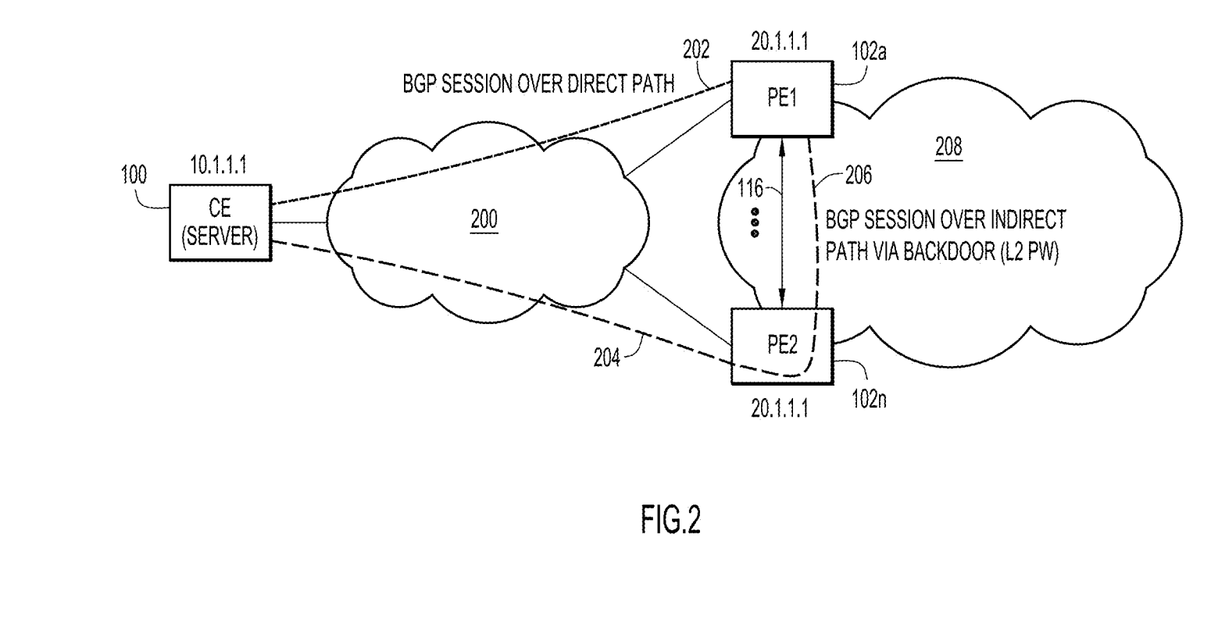
FIG. 2 is a diagram illustrating a CE being multi-homed to a pool of PE network devices, according to another example embodiment.

FIG. 2 is a diagram illustrating a CE device being multi-homed to a pool of PE network devices, according to another example embodiment. In FIG. 2, instead of LAG (links L1, L2, L3, and L4), the CE device 100, shown as CE (Server) 100, is connected to a pool of PE network devices 102a-102n, shown as PE1-PE2, via Anycast pseudowire 200 (for an underlay network). As shown in FIG. 2, a BGP session can be established over a direct path 202 with the PE network device 102a from among a pool of PE network devices 102a-102n. The PE network device 102a is the active PE network device and a BGP session endpoint. However, a direct link to the PE network device 102a can fail or network events in a core network can make the PE network device 102a more costly than one of the other PE network devices in the pool, such as the PE network device 102n. Accordingly, the traffic will flip from the PE network device 102a to the PE network device 102n. If these conditions occur, session switchover may be undesirable. That is, it may be undesirable to tear down the BGP session with the PE network device 102a to establish a new session with the PE network device 102n because some traffic will be lost during this time, without a graceful restart (GR) and/or because of the latency incurred in establishing a new BGP session. Accordingly, the ownership of the BGP session is signaled among the PE network devices 102a-102n, in the pool, at 116 that is analogous to the signaling explained above with reference to FIG. 1 and accordingly, detailed description is not repeated here.

Based on the established ownership of the BGP session, instead of the session switchover, rerouting of traffic is accomplished. That is, the traffic from the CE device 100 arrives at the PE network device 102n via a direct link 204. The PE network device 102n reroutes the IP packets of the BGP session over an indirect link 206. The indirect link 206 is a backdoor path established via the core network. The indirect link 206 is a L2 pseudowire (PW) or EVPN traffic redirect in the L2 PWs 208. Therefore, the BGP session need not be torn down for the PE direct path failure cases.

Figure 3:
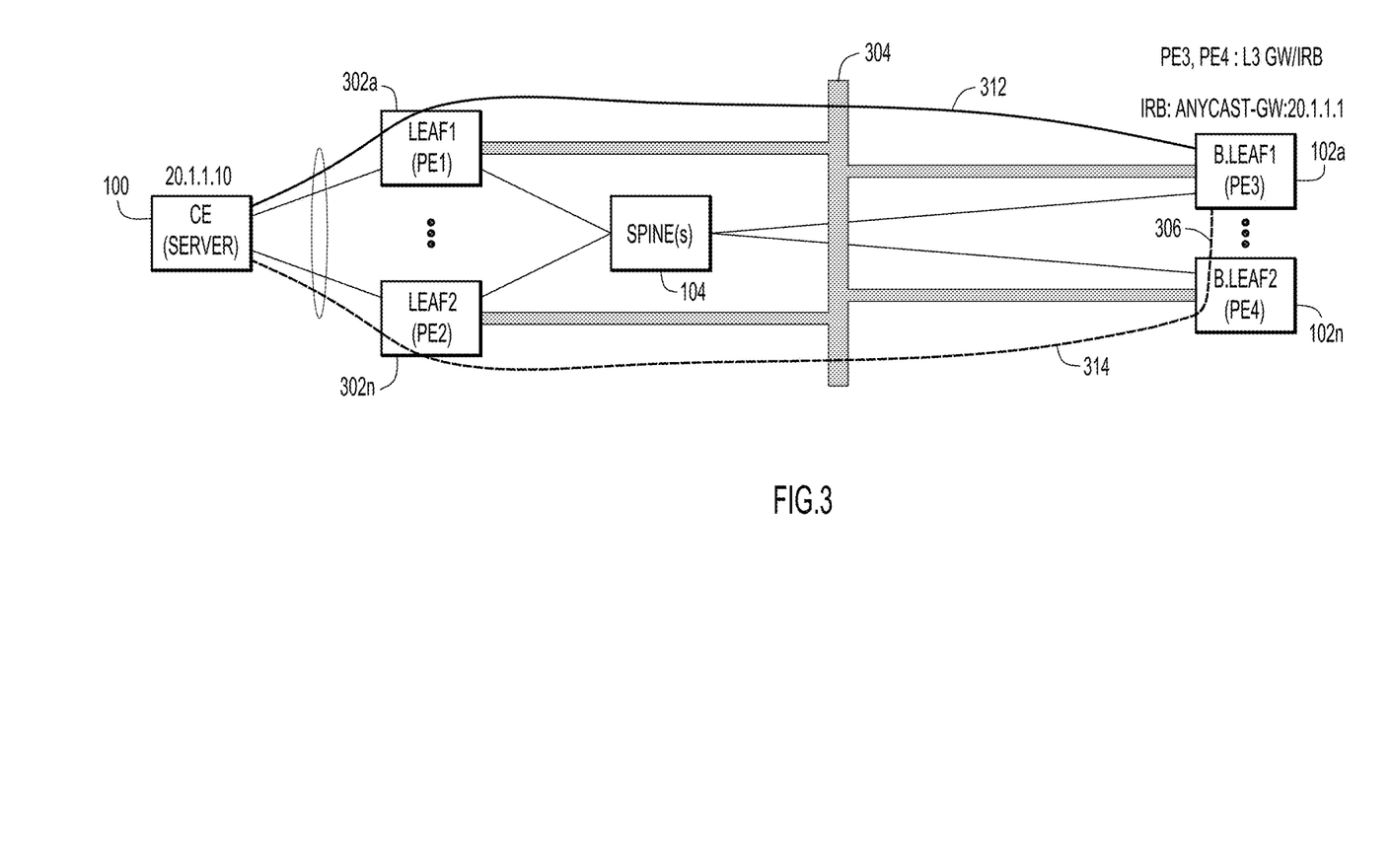
FIG. 3 is a diagram illustrating a CE device being multi-homed to a pool of Layer 3 PE network devices via an overlay segment between a Layer 2 PE network device attached to the CE device, according to another example embodiment.

FIG. 3 is a diagram illustrating a CE device being multi-homed to a pool of L3 PE network devices via an overlay segment that includes a L2 PE network device, according to another example embodiment.

As shown in FIG. 3, the CE device 100, shown as CE (Server), is logically multi-homed to a number of PE network devices 102a-102n, which are L3 PE network devices, shown as B.Leaf1(PE3)-B.Leaf2(PE4). The CE device 100 is also multi-homed to L2 PE network devices 302a-302n, shown as Leaf1(PE1)-Leaf2(PE2). The L2 PE network devices 302a-302n are also connected to one or more spine switches 104, shown as Spine(s) 104. As is known in the art, the number of CE devices, L2 PE network devices and L3 PE network devices, and the spine switches may vary widely depending on a particular implementation of the fabric.

As shown in FIG. 3, the CE device 100 is logically connected to multiple L3 PE network devices (the network devices 102a-102n) via an overlay segment 304. The overlay segment 304 establishes a logical connection between the L2 PE network devices 302a-302n and the PE network devices 102a-102n. This is similar to the Anycast pseudowire embodiment described above with reference to FIG. 2, except that instead of the pseudowires, an overlay segment 304 is provided. The overlay segment 304 includes encapsulation, such as VXLAN MPLS segment routing (SR), that provides connectivity for the CE device 100 to reach the PE network devices 102a-102n.

In FIG. 3, a BGP session to a gateway address (Anycast-GW:20.1.1.1) over a direct overlay path is established with the PE network device 102a, at 312. That is, the PE network device 102a becomes the owner of the BGP session with the CE device 100. The session ownership parameters may be signaled, e.g., via the overlay segment 304, to the PE network devices 302a-302n in addition to the PE network devices 102a-102n. At 314, if the BGP session data is hashed onto a link that connects the CE device 100 to the PE network device 102n via the PE network device 302n, the BGP session data is still delivered to the owner PE network device 102a via an overlay segment 306. That is, the BGP session data is delivered over an indirect overlay path via the PE network device 302n and the PE network device 102n to the owner PE network device 102a. The overlay segment 306 is used between the L3 PE network devices 102a-102n to redirect the session packets to the owner L3 PE network device.

In the example of FIG. 3, an additional optional optimization may be provided in which the session ownership parameters can be signaled to the L2 PE network devices as well as to the L3 PE network devices, as explained above. Further, the L2 PE network devices are enabled to directly forward the session packets from CE device 100 to the owner (the PE network device 102a) via the overlay segment 304.

Figure 4A:
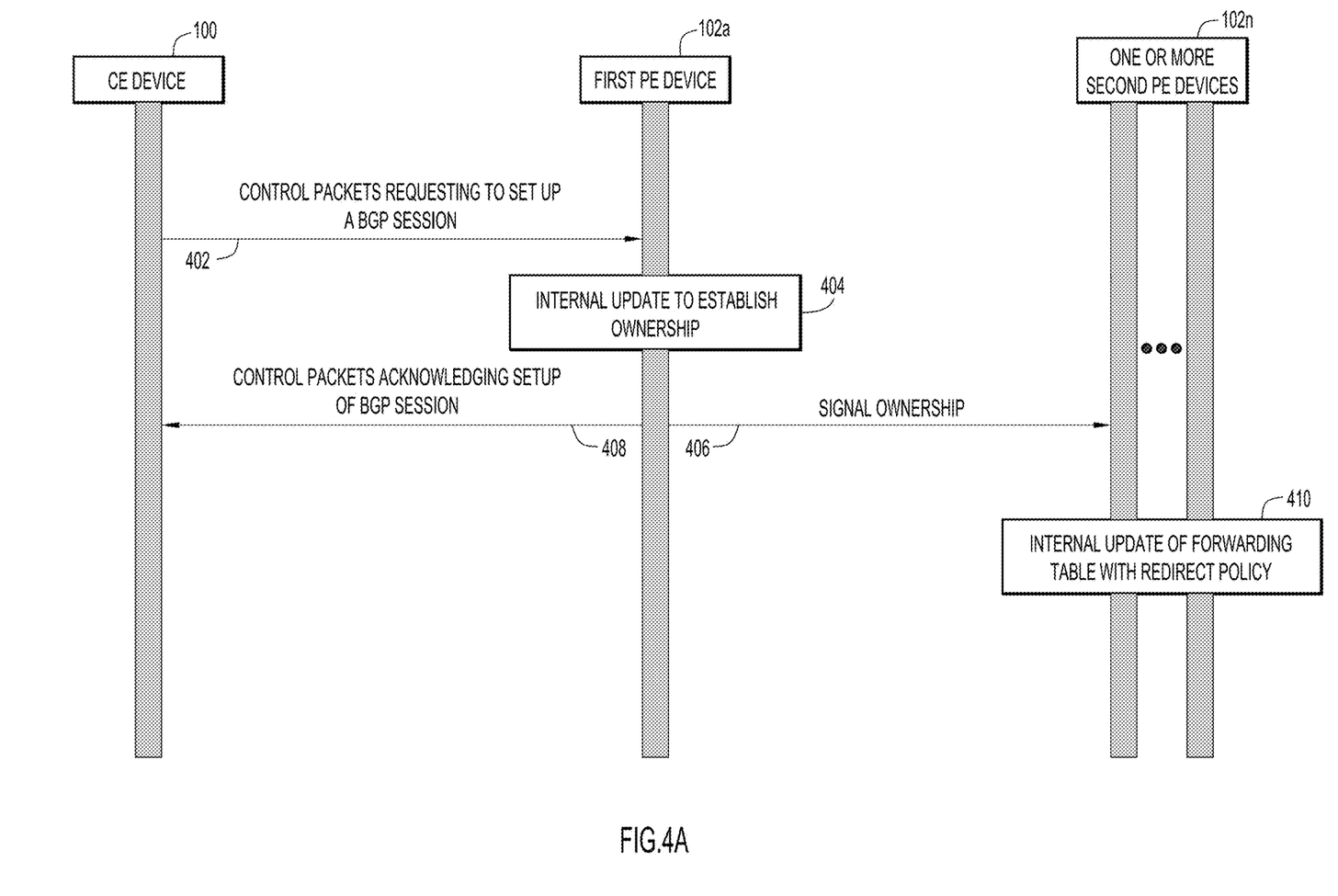
FIGS. 4A and 4B are sequence diagrams illustrating a process for establishing a PE-CE communication session, according to various example embodiments.
Figure 4B:
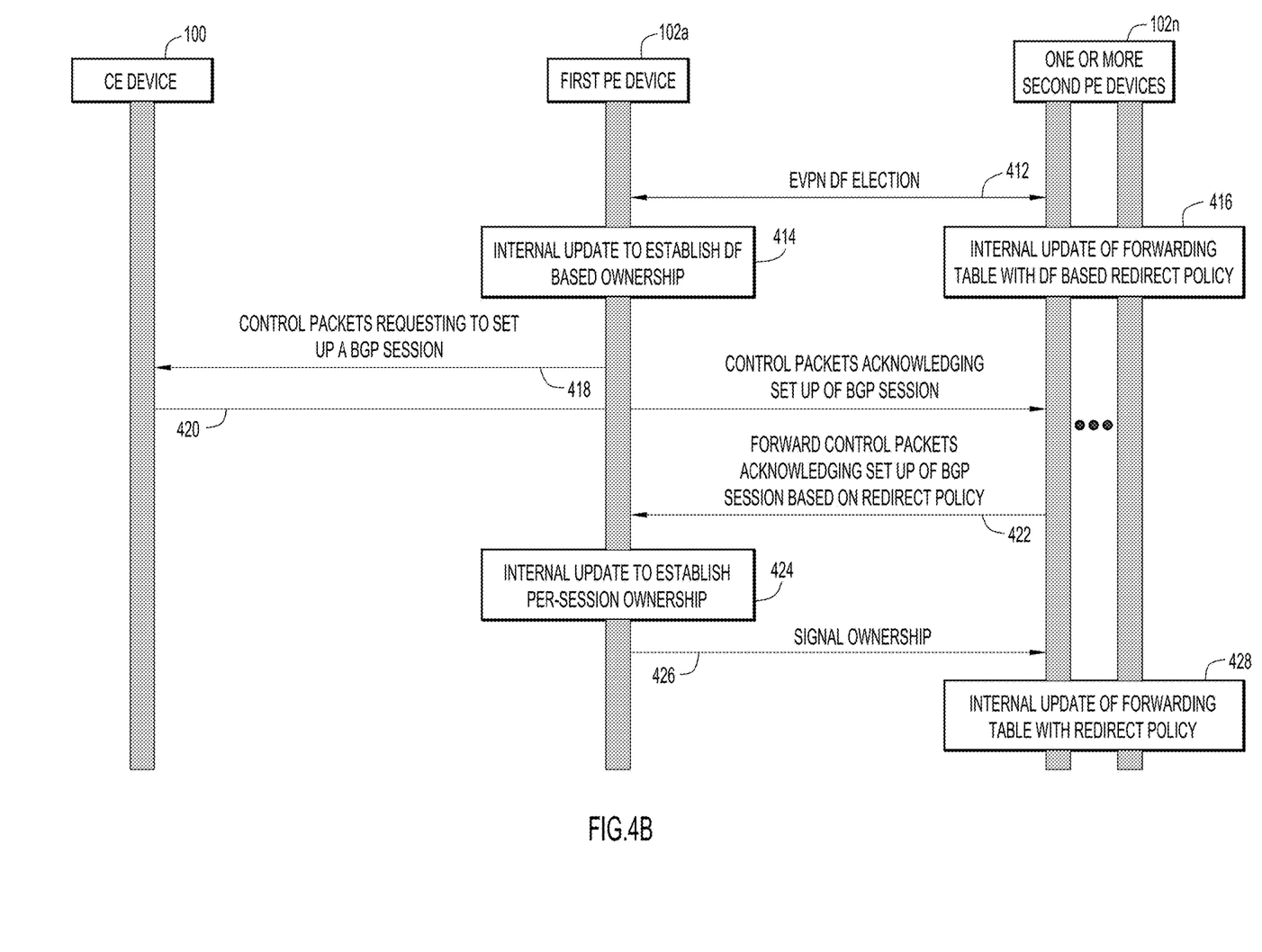

FIGS. 4A and 4B are sequence diagrams illustrating establishing a PE-CE communication session, according to various example embodiments. Specifically, FIG. 4A is a sequence diagram illustrating passively establishing a PE-CE communication session, according to an example embodiment and FIG. 4B is a sequence diagram illustrating actively establishing a PE-CE communication session, according to an example embodiment.

As shown in FIG. 4A, at 402, the CE device 100 sends control packets requesting to set up a BGP session. The control packets are hashed to one of the links at the CE device 100 and arrives to one of the PE network devices in the pool, e.g., the first PE network device 102a. Since the session is set up passively, the flow hashing from the CE device 100 determines at which PE network device the flow terminates, and hence, implicitly determines the BGP session ownership, which is the first PE network device 102a in FIG. 4A. In an example embodiment of FIG. 4A, the PE network devices are passive and the CE device initiates establishment of the PE-CE session. As explained above, this option may be useful to provide a more granular load balancing of the BGP sessions in some specific deployments.

At 404, the first PE network device 102a performs an internal update to establish ownership. Internal update may include updating the forwarding table of the first PE network device 102a with information of the BGP session. At 406, the first PE network device 102a (which is the owner of the established BGP session) signals ownership to other PE network devices 102n in the PE network device pool. That is, to make the session persistent (deterministically terminate at the owner PE network device 102a), the first PE network device 102a signals its session ownership to the other PE network devices 102n in the pool that share the multi-homing segments. The session ownership is signaled once it is established via an overlay signaling protocol, such as EVPN or LISP. As an alternative or in addition, the session ownership may be signaled to a router reflector, which stores this information for other PE network devices 102n in the pool. The ownership is signaled via BGP-EVPN, preferably as a new route-type that carries the session parameters in a tuple: {Neighbor-IP, IP-Protocol, Port(s), such as L4-port}.

In one example embodiment, the session tuple signaling is an attribute or an extended community attribute (extcomm) to an existing Type-2 route for neighbor-IP. For example, Extcomm::IP-protocol, L4-port, which is a simple extension. Session state change results in update of Type-2 with extcomm added and/or removed. This example embodiment works similarly for the DF based protocol ownership.

As another example embodiment, the session tuple signaling could be performed in a separate route-type such as Route: Neighbor-IP, Local-IP, IP-protocol, Neighbor-port, Local-port. This may include an ext-comm or a flag or an indicator to indicate this IP flow-tuple is for the session-ownership. This is a more complex solution since a route needs to be generated or deleted for a session state change. On the other hand, this solution is extensible if sessions for multiple protocols need to be supported and can also be used for DF based ownership. It allows existing sessions to be persistent even if the DF changes.

At 408, the first PE network device 102a, the owner of the communication session, transmits a control packet acknowledging the setup of the BGP session to the CE device 100. Meanwhile, at 410, the one or more PE network devices 102*n* perform internal updates of their respective forwarding tables with a redirect policy. The redirect policy instructs the one or more PE network devices 102*n* to forward data packets of the established communication session to the first PE network device 102*a* (the owner). The one or more PE network devices 102*n* use the signaled protocol ownership/ flow parameters to install in their forwarding tables a redirect policy that forwards incoming established session packets to the first PE network device 102*a* over the EVPN L2 overlay segment, for example. This ensures that the established BGP sessions terminates on the owner PE network device 102*a* as long as the owner PE network device 102*a* is alive and has connectivity. The process is transparent, to the CE device 100.

FIG. 4B is a sequence diagram illustrating actively establishing a PE-CE communication session, according to an example embodiment. In FIG. 4B, the ownership is actively setup under the control of the multi-homed PE devices 102*a*-102*n*. For example, an EVPN DF selection/election is used to automatically assign ownership of the BGP session, at 412. The ownership may be assigned with the service instance based load-distribution provided by the EVPN-DF selection/election procedure. That is, the PE network device who is assigned to be the DF will be the owner of the PE-CE communication session. This is sufficient in a multi-tenant environment. Once the session ownership is established, the first PE network device 102*a* and one or more of second PE network devices 102*n* (in the pool) perform internal updates. Specifically, the first PE network device 102*a* perform an internal update to establish DF based ownership of the PE-CE session, at 414. Meanwhile, the one or more second PE devices 102*n* perform internal updates of their respective forwarding tables with DF based redirect policy, at 416. At 418, the first PE network device 102*a* transmits one or more control packet to the CE device 100 requesting to setup a BGP session with the CE device 100. At 420, the CE device 100 transmits one or more control packets to acknowledge the setup of the BGP session.

If the control packets are hashed on a different link such as link L4, as shown in FIG. 4B, the controls packets are received by one of the one or more second PE network devices 102*n*. Based on the redirect policy in the forwarding table of the PE network device 102*n* that received the control packets, the control packets acknowledging the setup of the BGP session are forwarded to the owner PE device i.e., the first PE network device 102*a*, at 422. At 424, the first PE network device 102*a* performs an internal update to establish per-session ownership. At 426, the same signaling sequence as in the passive case described above with reference to FIG. 4A is performed. Specifically, the first PE network device 102*a* signals ownership to the one or more second PE network devices 102*n*. At 428, the one or more second PE network devices 102*n* update their respective forwarding tables with the redirect policy, as explained above with reference to FIG. 4A. In short, each of the one or more second PE network devices 102*n* automatically install in a data plane, a redirect policy instructing the respective second PE network device to forward packets of the established PE-CE session to the owner PE (in this case, the first PE device 102*a*) via an overlay segment between the first PE network device 102*a* (the owner) and one of the second PE network devices 102*n* that received the packets of the established communication session. This ensures that the established session will always terminate on the owner PE network device 102*a* as long as the owner PE network device 102*a* is alive and has connectivity.

As explained above, the session ownership may be torn down under failure conditions described above, such as complete core isolation of the owner PE network device 102*a*. That is, session ownership may be torn down if the owner PE network device 102*a* loses all its links to the CE device 100 or the PE network device 102*a* dies. In these cases, the session ownership can be taken over by one of the second PE network devices 102*n* via either the DF or the implicit hashing mechanism.

According to various example embodiments explained above, the A-A forwarding is maintained for the data, while the BGP session itself is only with a single device in the multi-homing cluster. While example embodiments described above focus on the BGP session due to its widely prevalent application, one of ordinary skill in the art would readily appreciate that example embodiments are applicable to other protocols as well. Various example embodiments can be applied to other potential EVPN deployment scenarios such as PE-CE sessions at Service Provider (SP) aggregation PEs, using Anycast PW headend termination on the PE network devices, and IGP.

Figure 5:
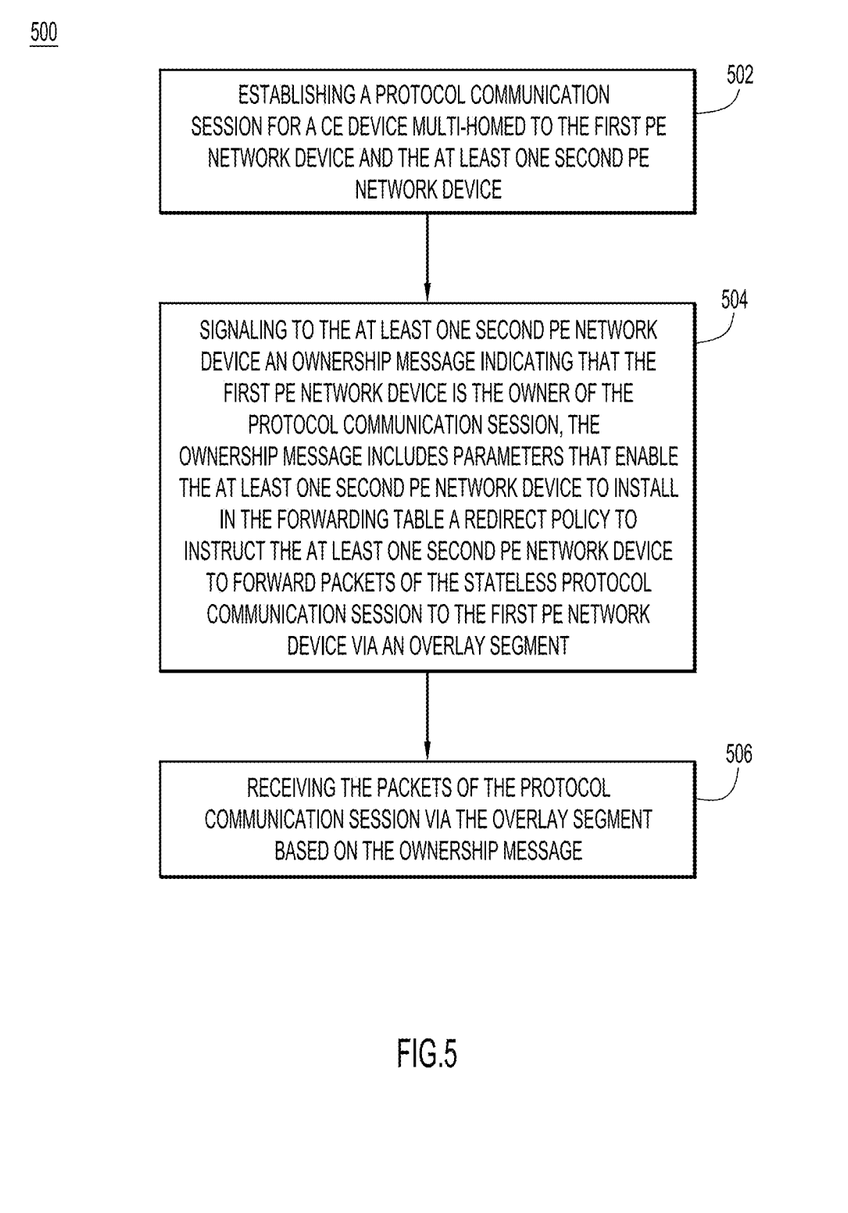
FIG. 5 is a flowchart illustrating a method for establishing persistent ownership of a CE protocol session, according to an example embodiment.

FIG. 5 is a flowchart illustrating a method 500 of establishing persistent ownership of a CE protocol communication session, according to an example embodiment. The method 500 is performed by a first PE network device. In operation 502, the first PE network device from among a plurality of PE network devices that include the first PE network device and at least one second PE network device, establishes a CE protocol communication session for a CE device multi-homed to the first PE network device and the at least one second PE network device. The first PE network device is the owner of the CE protocol communication session. In operation 504, the first PE network device signals to the at least one second PE network device, an ownership message indicating that the first PE network device is the owner of the CE protocol communication session. The ownership message includes parameters that enable the at least one second PE network device to install in a forwarding table a redirect policy to instruct the at least one second PE network device to forward packets of the CE protocol communication session to the first PE network device via an overlay segment. At 506, the first PE network device receives the packets of the CE protocol communication session via the overlay segment based on the ownership message.

According to one or more example embodiments, the first PE network device and the at least one second PE network device may be connected to the CE device via multi-chassis aggregation physical links (i.e., Link Aggregation Control Protocol—LACP) and the first PE network device may receive the packets of the CE protocol communication session from the CE device from the at least one second PE network device via the overlay segment.

According to one or more example embodiments, the first PE network device and the at least one second PE network device may be connected to the CE device using Anycast Pseudowire techniques.

According to one or more example embodiments, the plurality of PE network devices may be layer 3 (L3) network devices and the CE device may be logically connected to the plurality of PE network devices via an overlay segment between a L2 PE network device to which the CE device is attached and the plurality of PE network devices. The signaling of the ownership message may include signaling the ownership message to the L2 PE network device and other ones of the plurality of PE network devices.

According to one or more example embodiments, the method 500 may further include automatically assigning ownership of the CE protocol communication session to the first PE device by a designated forwarder selection process performed by the first PE network device and the at least one second PE network device.

According to one or more example embodiments, the designated forwarder selection process may be an Ethernet Virtual Private Network (EVPN) protocol designated forwarder selection process performed among the first PE network device and at least the second PE network device to automatically assign ownership of the CE protocol communication session, and the CE protocol communication session may be a Border Gateway Protocol (BGP) session.

According to one or more example embodiments, the parameters in the ownership message may be defined in a separate BGP-EVPN route-type specifying neighbor Internet Protocol (IP) address, protocol, and at least one port and include a flag or an indicator to indicate that the ownership message is for session ownership.

According to one or more example embodiments, the signaling of the ownership message may be an overlay signaling and the parameters in the ownership message may be defined as an attribute or a data extension configuration to an existing type-2 or type 5 route for a neighbor Internet Protocol (IP) address and include IP-protocol and Layer 4 port.

According to one or more example embodiments, the overlay segment may be an Ethernet Virtual Private Network (EVPN) Layer 2 overlay segment.

According to one or more example embodiments, the CE protocol communication session may be in accordance with a PE-CE protocol that includes at least one of the Border Gateway Protocol (BGP), the Interior Gateway Protocol (IGP), Open Shortest Path First (OSPF) protocol, and Intermediate System-to-Intermediate System (ISIS) protocol.

According to one or more example embodiments, the method may further include implicitly determining ownership of the CE protocol communication session to be the first PE network device based on hashing of a packet obtained from the CE device.

According to one or more example embodiments, the first PE network device and the at least one second PE network device may share the same anycast gateway address such that the packets from the CE device are hashed to one of the first PE network device and the at least one second PE network device, based on traffic load balancing.

According to one or more example embodiments, the method may further include maintaining, by the first PE network device, ownership of the CE protocol communication session until a failure of the first PE network device or a complete CE device link isolation such that based on a link failure between the CE device and the first PE network device, the first PE network device receives the packets of the CE protocol communication session from the CE device via the at least one second PE network device.

According to one or more example embodiments, the method may further include forwarding, by the first PE network device, the received packets of the CE protocol communication session to a spine switch or a network element at a next level. The plurality of PE network devices are leaf switches and are each connected to the spine switch or a set of spine switches and the receiving the packets of the CE protocol communication session by the first PE network device includes deterministically terminating on the first PE network device the packets of the CE protocol communication session from the CE device to an anycast gateway address shared by the first PE network device and the at least one second PE network device.

In still another embodiment, a network element (apparatus) is provided that includes a number of ports at which network communications are received and from which the network communications are sent, a memory, and a processor coupled to the memory. The processor is operative to establish a CE protocol communication session for a CE device multi-homed to the apparatus and at least one PE network device. The apparatus is an owner of the CE protocol communication session. The processor is further operative to signal to the at least one PE network device, an ownership message indicating that the apparatus is the owner of the CE protocol communication session. The ownership message includes parameters that enable the at least one PE network device to install in a forwarding table a redirect policy to instruct the at least one PE network device to forward packets of the CE protocol communication session to the apparatus via an overlay segment. The processor is further operative to receive the packets of the CE protocol communication session via the overlay segment based on the ownership message.

According to one or more example embodiments, the apparatus and the at least one PE network device are connected to the CE device via multi-chassis aggregation physical links (i.e., Link Aggregation Control Protocol— LACP) and the apparatus receives the packets of the CE protocol communication session from the CE device via the overlay segment between the at least one PE network device and the apparatus.

According to one or more example embodiments, the apparatus and the at least one PE network device are connected to the CE device using anycast Pseudowire techniques.

According to one or more example embodiments, the apparatus and the at least one PE network device are L3 network devices and the CE device is logically connected to the apparatus and the at least one PE network devices via an overlay segment between an L2 apparatus to which the CE device is attached and the at least one PE network device. The processor may signal the ownership message to the L2 apparatus and the at least one PE network devices.

In yet another embodiment, one or more non-transitory computer readable storage media encoded with instructions are provided. When this media is executed by a processor, they cause the processor to establish, at a first PE network device among a plurality of PE network devices, a CE protocol communication session for a CE device multi-homed to the first PE network device and at least one second PE network device of the plurality of PE network devices. The first PE network device is an owner of the CE protocol communication session. The media further cause the processor to signal, to the at least one second PE network device, an ownership message indicating that the first PE network device is the owner of the CE protocol communication session. The ownership message includes parameters that enable the at least one second PE network device to install in a forwarding table a redirect policy to instruct the at least one second PE network device to forward packets of the CE protocol communication session to the first PE network device via an overlay segment, and receive the packets of the CE protocol communication session via the overlay segment based on the ownership message.

In one or more example embodiments, the first PE network device and the at least one second PE network device are connected to the CE device via multi-chassis aggregation physical links and the media executed by the processor cause the processor to receive, at the first PE network device, the packets of the CE protocol communication session from the CE device via the at least one PE network device via the overlay segment.

Figure 6:
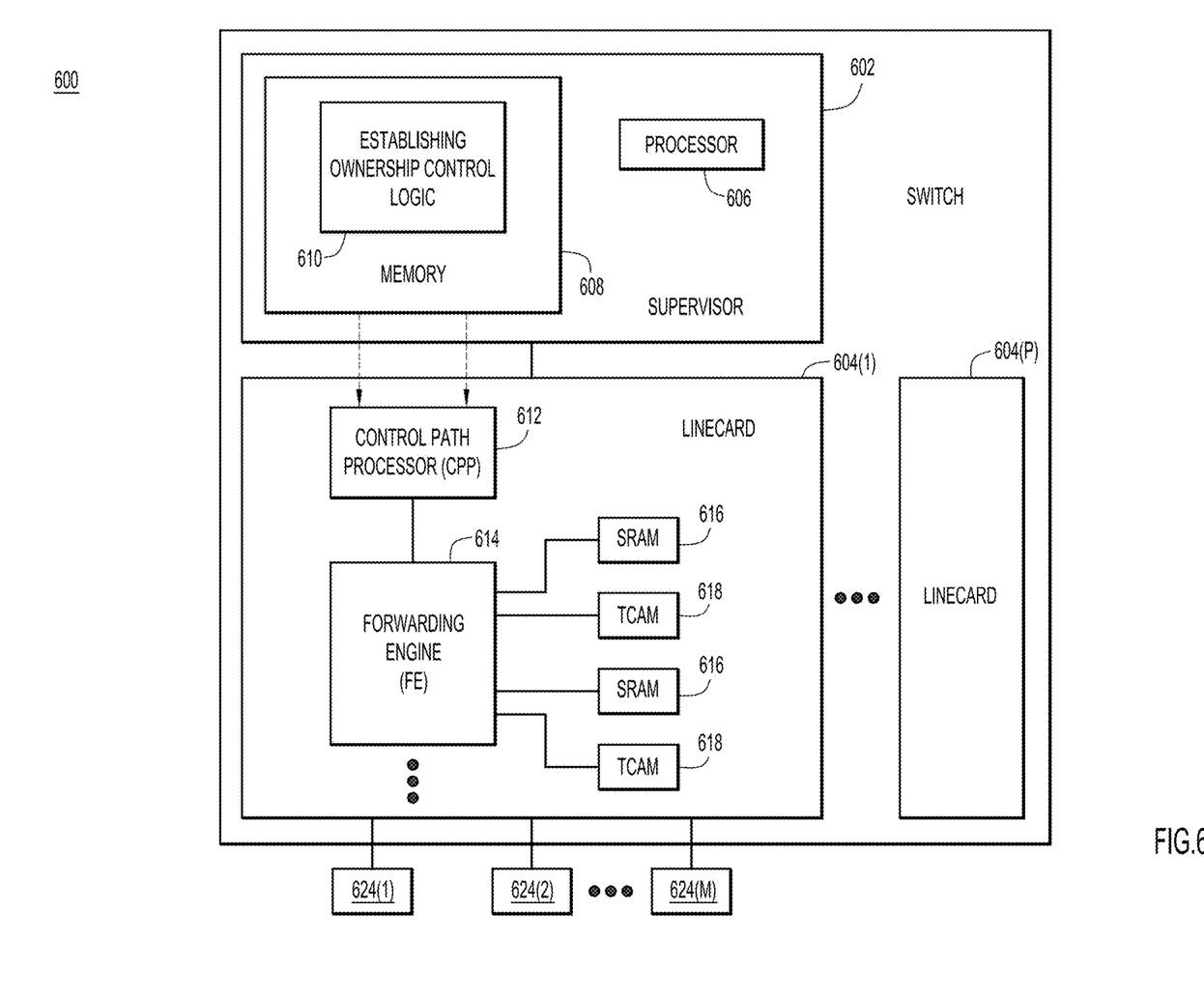
FIG. 6 is a block diagram illustrating a PE network device configured to establish persistent ownership of a CE protocol session, according to an example embodiment.

FIG. 6 is a block diagram illustrating a PE network device 600 (e.g., a leaf switch or the switch 600) configured to perform the operations described herein, according to an example embodiment.

The switch 600 may include a supervisor module 602 and a plurality of linecards 604(1)-604(P). The supervisor module 602 includes a processor 606 (e.g., microprocessor or microcontroller) and a memory 608. The memory 608 stores instructions for establishing ownership control logic 610, that is control logic for establishing ownership of a communication session between the CE device and the PE network device (switch 600), which are executed by the processor 606 to enable the PE network device (switch 600) to perform the operations described herein. In addition, the memory 608 may store a local database maintained by the PE network device (the switch 600) for storing ownership information or may store a forwarding table with a redirect policy for the communication sessions for which the PE network device (the switch 600) is not an owner and for which ownership is assigned to another PE network device multi-homed to the same CE device.

The linecards 604(1)-604(P) each include a Control Path Processor (CPP) 612 configured to program a plurality of Forwarding Engines (FEs) 614, which may be embodied by hardware Application Specific Integrated Circuits (ASICs). Each of the FEs 614 in a linecard is associated with respective Static Random Access Memories (SRAMs) 616 and TCAMs 618. Traffic ingresses and egresses the PE network device (switch 600) at one of a plurality of network ports 624(1)-624(M) of a given linecard 604(1)-604(P). The ports 624(1)-624(M) may be a physical port of the PE network device (switch 600) at which network packets are directed from the PE network device to the CE device and or other PE network devices multi-homed to the same CE device.

The memory 608 may comprise read only memory (ROM), random access memory (RAM), magnetic disk storage media devices, optical storage media devices, flash memory devices, electrical, optical, or other physical/tangible memory storage devices. Thus, in general, the memory 608 may comprise one or more tangible (non-transitory) computer readable storage media (e.g., a memory device) encoded with software comprising computer executable instructions and when the software is executed (by the controller) it is operable to perform the operations described herein.

It should be appreciated that FIG. 6 provides only an illustration of one embodiment and does not imply any limitations with regard to the environments in which different embodiments may be implemented. Many modifications to the depicted environment may be made.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

It is to be understood that the software of example embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of example embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of example embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). The database system may be included within or coupled to the server and/or client systems. The database systems and/or storage structures may be remote from or local to the computer or other processing systems, and may store any desired data (e.g., data relating to contact center interaction routing).

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of example embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   establishing, at a first provider edge (PE) network device among a plurality of PE network devices that includes the first PE network device and at least one second PE network device, a control session between the first PE network device and a customer edge (CE) device multi-homed to the first PE network device and the at least one second PE network device, wherein the first PE network device is an owner of the control session;
   signaling, by the first PE network device, to the at least one second PE network device, an ownership message indicating that the first PE network device is the owner of the control session, the ownership message including parameters that enable the at least one second PE network device to install in a forwarding table a redirect policy to instruct the at least one second PE network device to forward control packets of the control session to the first PE network device;
   responsive to a failure in a direct link between the first PE network device and the CE device, maintaining the first PE network device as the owner of the control session, enabling the control session to be persistent in a designated forwarder selection process performed by the first PE network device and the at least one second PE network device; and
   at the first PE network device, receiving the control packets of the control session from the at least one second PE network device.

2. The method of claim 1, wherein the first PE network device and the at least one second PE network device are connected to the CE device via multi-chassis aggregation physical links, and
   wherein the first PE network device receives the control packets of the control session from the CE device via the at least one second PE network device via an overlay segment.

3. The method of claim 1, wherein the first PE network device and the at least one second PE network device are connected to the CE device using anycast Pseudowire techniques.

4. The method of claim 1, wherein the plurality of PE network devices are Layer 3 (L3) network devices, and the CE device is logically connected to the plurality of PE network devices via an overlay segment between a Layer 2 (L2) PE network device to which the CE device is attached and the plurality of PE network devices, and wherein the signaling of the ownership message includes signaling the ownership message to the L2 PE network device and other ones of the plurality of PE network devices.

5. The method of claim 1, further comprising:
   automatically assigning ownership of the control session to the first PE network device by a designated forwarder selection process performed by the first PE network device and the at least one second PE network device.

6. The method of claim 5, wherein the designated forwarder selection process is an Ethernet Virtual Private Network (EVPN) protocol and the control session is a Border Gateway Protocol (BGP) session.

7. The method of claim 6, wherein the parameters in the ownership message are defined in a separate BGP-EVPN route-type specifying a neighbor Internet Protocol (IP) address, a protocol, and at least one port and wherein the parameters include an indicator to indicate that the ownership message is for the ownership of the control session.

8. The method of claim 6, wherein the signaling of the ownership message is an overlay signaling, and wherein the parameters in the ownership message are defined as an attribute or a data extension configuration to an existing type-2 route for a neighbor Internet Protocol (IP) address and include IP-protocol and Layer 4 port.

9. The method of claim 1, wherein the control session is in accordance with a PE-CE protocol that includes at least one of a Border Gateway Protocol (BGP), an Interior Gateway Protocol (IGP), an Open Shortest Path First (OSPF) protocol, and an Intermediate System-to-Intermediate System (ISIS) protocol.

10. The method of claim 1, further comprising:
    implicitly determining ownership of the control session to be the first PE network device based on hashing of a packet obtained from the CE device.

11. The method of claim 1, wherein the first PE network device and the at least one second PE network device share an anycast gateway address such that the packets from the CE device are hashed to one of the first PE network device and the at least one second PE network device, based on traffic load balancing.

12. The method of claim 1, further comprising:
    forwarding, by the first PE network device, the received packets of the control session to a spine switch or a network element at a next level,
    wherein the plurality of PE network devices are leaf switches and are each connected to the spine switch, and
    wherein the receiving the control packets of the control session by the first PE network device includes deterministically terminating on the first PE network device the control packets of the control session from the CE device to an anycast gateway address shared by the first PE network device and the at least one second PE network device.

13. An apparatus comprising:
    a plurality of ports at which network communications are received and from which the network communications are sent;
    a memory; and
    a processor coupled to the memory, wherein the processor is operative to:
      establish a control session for a customer edge (CE) device multi-homed to the apparatus and at least one provider edge (PE) network device, wherein the apparatus is an owner of the control session;
      signal to the at least one PE network device, an ownership message indicating that the apparatus is the owner of the control session, wherein the ownership message includes parameters that enable the at least one PE network device to install in a forwarding table a redirect policy to instruct the at least one PE network device to forward control packets of the control session to the apparatus;
      responsive to a failure in a direct link between the apparatus and the CE device, maintain the apparatus as the owner of the control session, enabling the control session to be persistent in a designated forwarder selection process performed by the apparatus and the at least one PE network device; and receive the control packets of the control session from the at least one PE network device.

14. The apparatus of claim 13, wherein:
the apparatus and the at least one PE network device are connected to the CE device via multi-chassis aggregation physical links, and
the apparatus receives the control packets of the control session from the CE device via an overlay segment between the at least one PE network device and the apparatus.

15. The apparatus of claim 13, wherein the apparatus and the at least one PE network device are connected to the CE device using anycast Pseudowire techniques.

16. The apparatus of claim 13, wherein the apparatus and the at least one PE network device are Layer 3 (L3) network devices, and the CE device is logically connected to the apparatus and the at least one PE network device via an overlay segment between a Layer 2 (L2) apparatus to which the CE device is attached and the at least one PE network device, and wherein the processor signals the ownership message to the L2 apparatus and the at least one PE network device.

17. One or more non-transitory computer readable storage media encoded with instructions that, when executed by a processor, cause the processor to:
at a first provider edge (PE) network device among a plurality of PE network devices, establish a control session for a customer edge (CE) device multi-homed to the first PE network device and at least one second provider edge (PE) network device of the plurality of PE network devices, wherein the first PE network device is an owner of the control session;
signal, to the at least one second PE network device, an ownership message indicating that the first PE network device is the owner of the control session, wherein the ownership message includes parameters that enable the at least one second PE network device to install in a forwarding table a redirect policy to instruct the at least one second PE network device to forward control packets of the control session to the first PE network device;
responsive to a failure in a direct link between the first PE network device and the CE device, maintain the first PE network device as the owner of the control session, enabling the control session to be persistent in a designated forwarder selection process performed by the first PE network device and the at least one second PE network device; and
receive the control packets of the control session from the at least one second PE network device.

18. The one or more non-transitory computer readable storage media according to claim 17, wherein the first PE network device and the at least one second PE network device are connected to the CE device via multi-chassis aggregation physical links and wherein the first PE network device receives the control packets of the control session from the CE device via the at least one second PE network device via an overlay segment.

19. The one or more non-transitory computer readable storage media according to claim 17, wherein the first PE network device and the at least one PE network device are connected to the CE device using anycast Pseudowire techniques.

20. The one or more non-transitory computer readable storage media according to claim 17, wherein the first PE network device and the at least one second PE network device are Layer 3 (L3) network devices, and the CE device is logically connected to the first PE network device and the at least one second PE network device via an overlay segment between a Layer 2 (L2) PE network device to which the CE device is attached and the at least one second PE network device, and wherein the processor signals the ownership message to the L2 PE network device and the at least one second PE network device.

* * * * *